A. H. NELLER.
ELEVATED CARRIER.
APPLICATION FILED FEB. 12, 1910.
992,036.
Patented May 9, 1911.
4 SHEETS—SHEET 4.
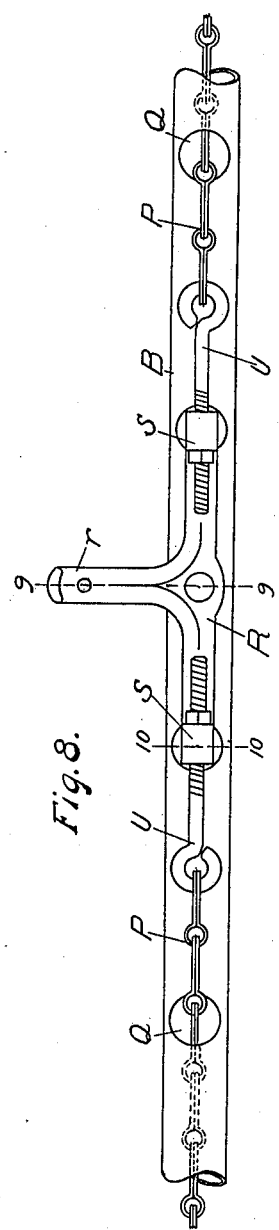
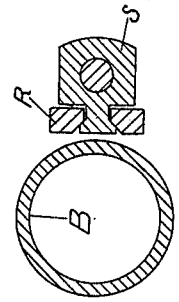
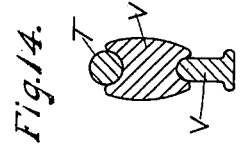
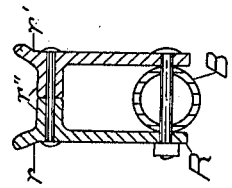
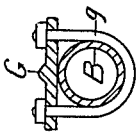
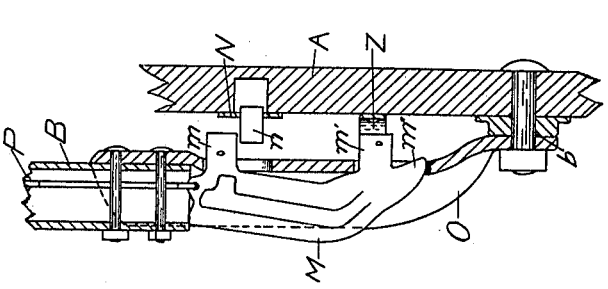
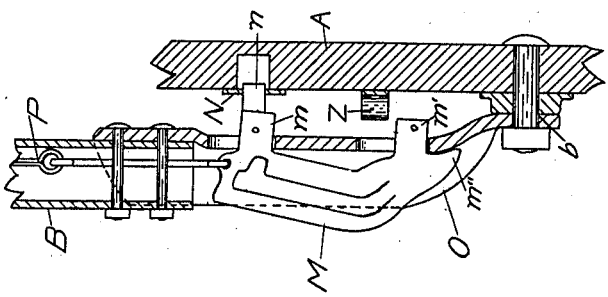
Witnesses:
Inventor:
Albert H. Neller

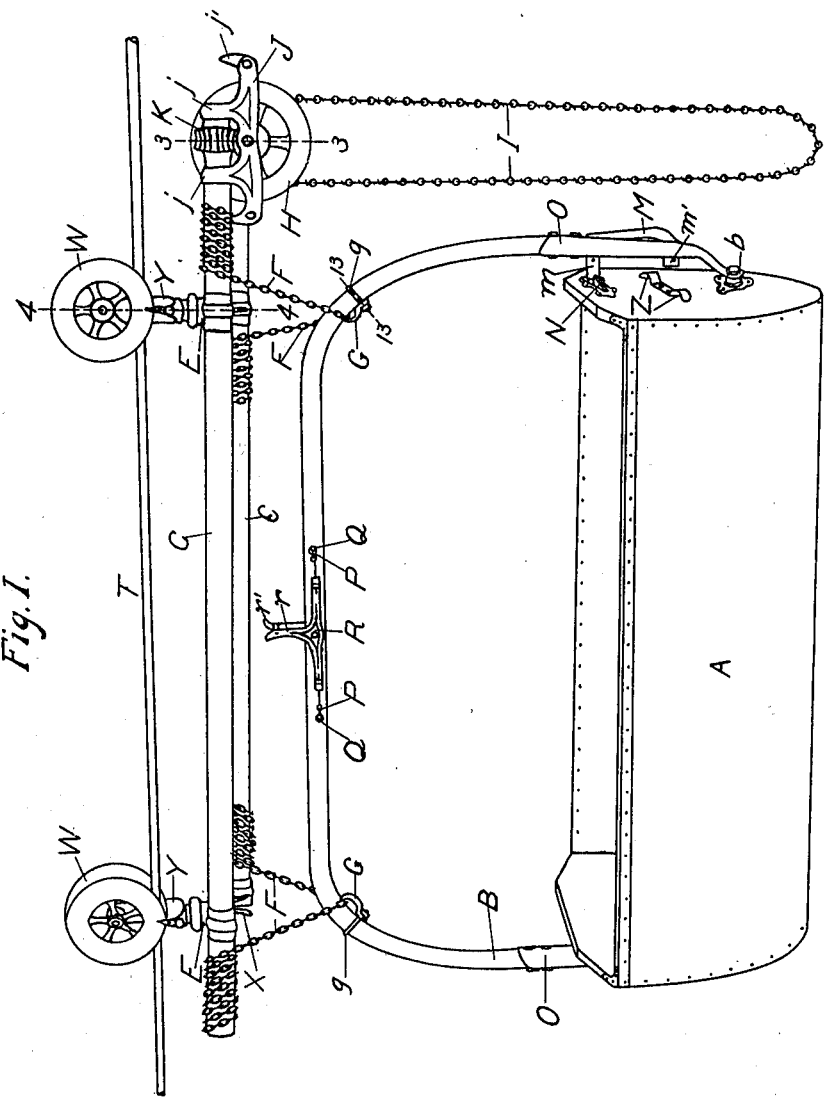

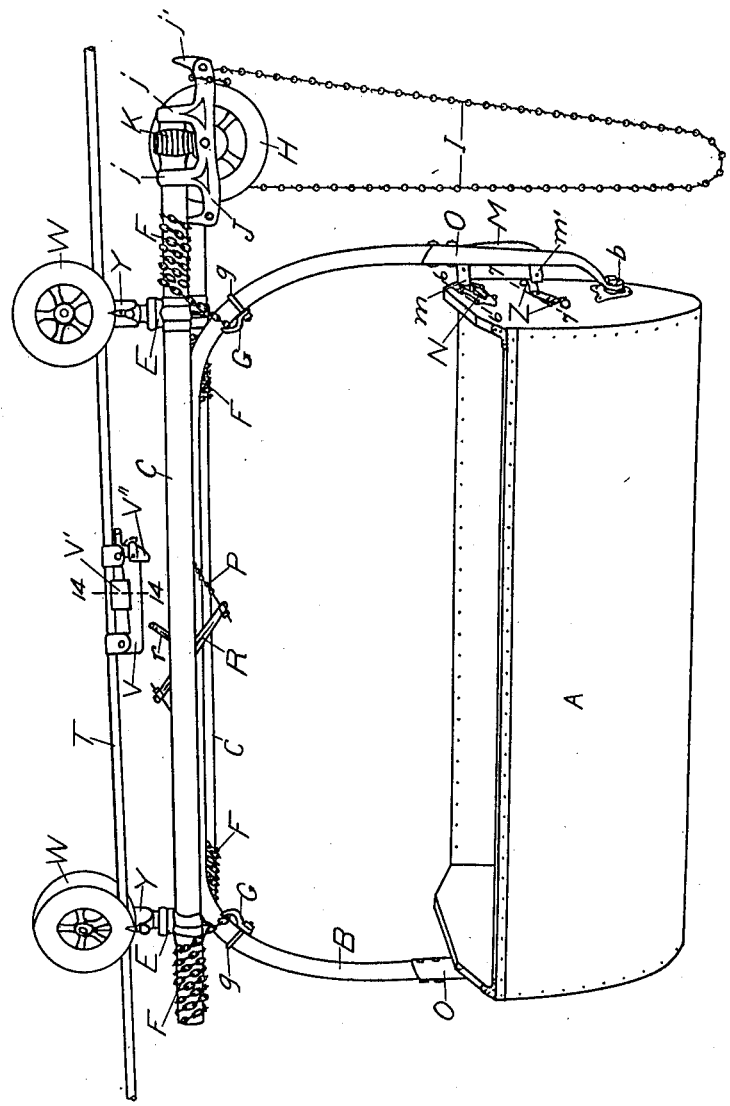

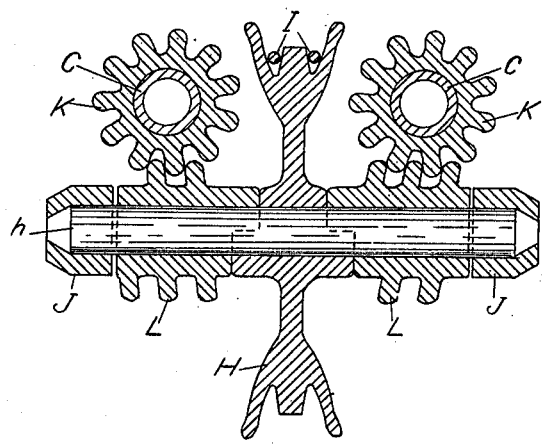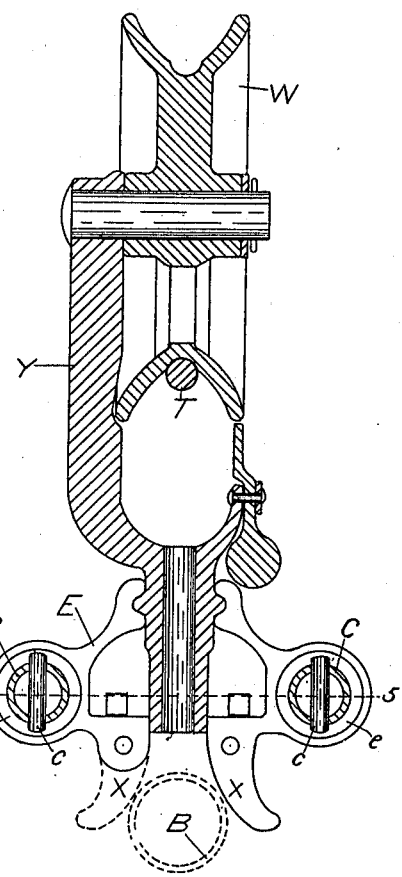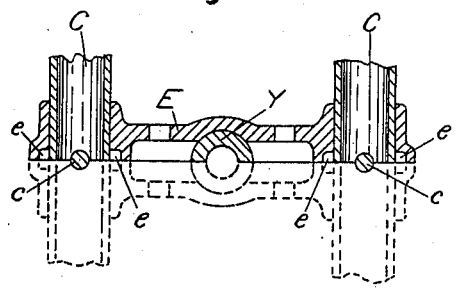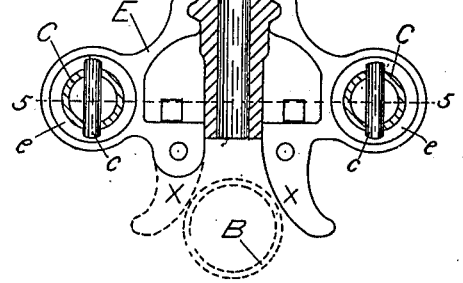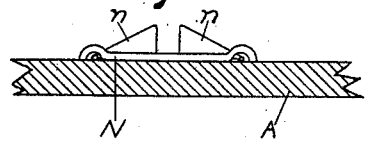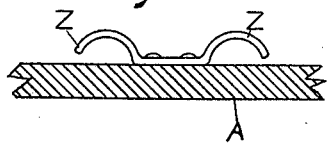

UNITED STATES PATENT OFFICE.

ALBERT H. NELLER, OF FAIRFIELD, IOWA, ASSIGNOR TO LOUDEN MACHINERY COMPANY, OF FAIRFIELD, IOWA, A CORPORATION OF IOWA.

ELEVATED CARRIER.

992,036.　　　　　Specification of Letters Patent.　　　Patented May 9, 1911.

Application filed February 12, 1910. Serial No. 543,626.

*To all whom it may concern:*

Be it known that I, ALBERT H. NELLER, a citizen of the United States, residing at Fairfield, in the county of Jefferson, State of Iowa, have invented a new and useful Improvement in Elevated Carriers, of which the following is a specification.

My invention relates to that class of carriers designed to run on an overhead track and to carry material and articles of different kinds from one point to another and to dump or discharge the same at any desired point; and it consists of improved means whereby the load holding and discharging receptacle may be raised and lowered, and be held in loaded position and the load discharged. Also, in other features which will be duly set forth in this specification and definitely defined in the claims.

In the accompanying drawings which form a part of this specification, Figure 1 is a perspective of a carrier embodying the features of my invention. Fig. 2 is the same showing the carrier in a different position. Fig. 3 is an enlarged transverse section on line 3—3 of Fig. 1. Fig. 4 is the same on line 4—4 of Fig. 1. Fig. 5 is a horizontal section on line 5—5 of Fig. 4, the dotted lines showing the adjoining portions which were cut away in Fig. 4. Fig. 6 is an enlarged horizontal section on line 6—6 of Fig. 2 showing a catch secured to the end, of the load holding receptacle. Fig. 7 is the same on line 7—7 of Fig. 2, showing a latch setting device attached to the end of the receptacle. Fig. 8 is an enlarged side view of the central portion of the bail of the receptacle. Fig. 9 is a transverse section on line 9—9 of Fig. 8. Fig. 10 is an enlarged transverse section on line 10—10 of Fig. 8. Fig. 11 is an enlarged vertical section of a portion of the end of the receptacle and of the lower end of the bail pivoted thereto, in the position shown in Fig. 1. Fig. 12 is the same in the position shown in Fig. 2. Fig. 13 is an enlarged transverse section on line 13—13 of Fig. 1. Fig. 14 is the same on line 14—14 of Fig. 2.

Referring to the drawings, A is a load holding receptacle supported by a tubular bail B.

C represents a pair of shafts which are journaled and revoluble in castings E. These castings are preferably made of two similar parts joined together by bolts or otherwise.

T represents an overhead track upon which wheels W mounted in the yokes Y are adapted to run. The lower ends of the yokes are inserted in vertical recesses or openings in the central portion of the castings E and are fitted to swivel therein. Horizontally disposed cylindrical openings are formed in the opposite ends of the castings E to receive and hold the shafts C.

Cylindrical recesses $e$ are made in the inner faces of the parts comprising the castings E surrounding the openings for the shafts and pins or keys $c$ are passed through the shafts so their ends will project into these recesses. By this means the shafts will be free to rotate in the castings E and the castings will be held by the pins $c$ from slipping longitudinally on the shafts. Usually a separate connecting bar or shaft is required to hold the retaining casting in place on a rotatable shaft, but by making the castings E in two parts and providing the recesses $e$ and pins $c$ to fit in the recesses, a separate connecting bar or shaft will not be required. With slight modifications this arrangement may also be used when there is only a single rotatable shaft.

To raise and lower the receptacle, two chains F are used which are passed under the bail B and have their ends wound on the shafts C as shown in Figs. 1 and 2. The chains are kept from sliding on the bail by clips G which are secured thereon by U-shaped bolts $g$ as shown in Fig. 13, the bolt and clip being shown upside down in this figure.

H represents a wheel mounted on an axle $h$ (see Fig. 3.) and fitted with an endless chain I. The shaft $h$ has its ends fitted in a frame J preferably composed of two similar shaped castings bolted or otherwise secured together. The frame is provided on each side with upwardly projecting arms $j$ terminating in boxings which are mounted on projecting ends of the shafts C. Gears K are affixed to the shafts between the arms $j$ so as to hold the frame J in place on the shafts.

On each side of the wheel H, worm gears L are mounted on the shaft $h$ and arranged to engage the gears K. The worms L and the wheel H are arranged to interlock so that they will all rotate together on the axle $h$. By this means a pull on the chain I, causing the wheel H to rotate, will in turn rotate the gears K, by means of the worms L, and the chains F will be wound or unwound on the shafts C, according to the direction in which the chain I is drawn, and the receptacle A will be raised or lowered as desired. The ends of the chains F are secured to the shafts C at some distance apart, and as they are wound upon the shafts they will be drawn closer together and be made to wind evenly on the shafts and be kept from doubling on themselves.

The pitch of the worms L is generally sufficient to prevent the receptacle from running down when loaded, but in order to make this certain I have fitted the frame J with an upwardly projecting prong $j'$ upon which the chain may be lapped as shown in Fig. 2 to positively prevent movement of the gears. This prong is needed at the outer end only, but may be placed on the inner end also as shown in the drawings.

The receptacle A is held in loaded position by the ends $m$ of latch pieces M coming in contact with a catch N, preferably having two inwardly inclined parts $n$ with a space between them into which the ends $m$ are adapted to drop as most plainly shown in Figs. 6, 11 and 12. It is also preferable that the parts $n$ be hinged to a base at their outer ends and be held in operative position by springs so that they may be pushed back to let the ends $m$ pass over and enter the space between them. The lower ends of the bail B are provided with castings O the body of which is made U-shaped in cross section. The upper ends of these castings are bolted to the lower ends of the bail and their lower ends are pivoted to the ends of the receptacle at $b$.

The castings O are fitted with slotted perforations through which the lugs $m$ and $m'$ project, and when in latching position the lugs rest on the bottoms of said slots, as shown in Fig. 11. To unlatch the receptacle and allow it to discharge its load, the latch pieces M are lifted so the lugs $m$ will be above the catch $n$ and the latch pieces will be held in this position by the lower ends $m''$ catching on the edge of the lower slot, as shown in Fig. 12.

To lift the latch pieces, small chains P are connected to their upper ends and are passed up through the center of the bail and are brought to the outside through perforations at Q. Between these perforations a rocker bar R having an upwardly projecting arm $r$ is pivoted to the central portion of the bail. On the sides of the rocker bar near its ends are pivoted small studs S having holes through which eye bolts U are passed. The adjacent chains are connected to these eye bolts which are adjusted in the pieces S so the chains will be the proper lengths to operate the latch pieces M by the movement of the rocker bar which is operated by a stop on the track T as shown in Fig. 2.

The body of the stop designated by V is set at an angle to the track and is secured thereto by clips at each end which are slidable on the track. A wedge V' having grooves on its upper and lower edges is inserted between the body of the stop and the track. By adjusting the wedge up the incline of the body, the stop will be securely affixed to the track so as to operate the rocker bar when in proper position and by means of the chains P to lift the latch pieces M and release the receptacle as the carrier runs past the stop.

By adjusting the wedge down the incline the stop will be loosened on the track and may be slid along it to any desired point where it may be again fastened to the track by adjusting the wedge up the incline as before stated. The stop is provided with a depending part V'' pivoted to the body so it will stand rigid, as the carrier approaches it and will throw the end $r$ of the rocker bar as shown in Fig. 2, to discharge the load, but in returning the part V'' will swing out of the way as indicated by dotted lines, and will not effect the rocker bar as the carrier returns by it.

It is necessary that the upwardly extending end $r$ of the rocker bar be made wide enough in cross section to always come in contact with the stop and with this object, as well as that of a steadier movement, I have added another upwardly extending end $r'$ which is pivoted on the opposite side of the bail and both of the ends $r$ and $r'$ are fitted with inwardly extending parts $r''$ through which a rivet is passed to secure the parts together as shown in Fig. 9.

Before the stop on the track can operate the rocker bar to discharge the load, the receptacle must be elevated as closely as possible to the track and be held there so the upwardly extended ends $r$ and $r'$ will come in contact with the stop. To assist in holding the receptacle in this position I form on the lower edge of the castings E downwardly and outwardly projecting prongs X, preferably one on each half of the casting, so that the bail B will be drawn by the chains F between these prongs and be firmly held by them while in elevated position. The arrangement is clearly shown in Fig. 4, a cross section of the bail and the prong on the part of the casting cut away in this figure being shown in dotted lines.

When the rocker bar is thrown by the stop on the track, the latch pieces M will be lifted by the chains P so the upper lugs $m$ will be above and free from the parts n of the stop N. The points m″ of the latch pieces will then swing into the lower slots and will hold the latch pieces in this elevated position, as shown in Fig. 12. To release them from this position, and to cause them to automatically assume the position shown in Fig. 11, wherein the lugs m will come in contact with the catches n when the receptacle is righted, and hold it in loaded position, I have secured to the ends of the receptacle a strip of metal having outwardly extended ends Z, which are preferably curved as shown in Fig. 7.

As soon as the receptacle is tilted to a sufficient extent to discharge its contents the lower lugs m′ on the latching pieces will be pushed back by the extended ends Z and the ends m″ will be thrown out of the slots in the casting O, and the latch pieces M will drop to the latching position as shown in Fig. 11. At the same time the rocker bar will be drawn by the chains into the proper position (that shown in Figs. 1 and 8) to again come in contact with the stop on the track. By this means the latching pieces will be in position to have the lugs m engaged by the catch pieces n as soon as the ends Z have come in contact with the lugs m′. It will also be noted that as soon as the lugs m are freed from the catch pieces n the lugs m′ will be brought into the position of contact with the ends Z.

It is not necessary to follow implicitly all the details shown in the drawings, the essential features of my invention being fully set forth in the broader claims.

What I claim is;—

1. In elevated carriers, two horizontally disposed shafts mounted substantially parallel to each other in the framework of the carrier, means to rotate the shafts, a receptacle having a bail, and a hoisting chain secured to the bail and having its ends attached to the shafts.

2. In elevated carriers, two horizontally disposed shafts mounted substantially parallel to each other in the framework of the carrier, means to rotate the shafts, a receptacle having a bail and a hoisting chain secured to the bail and having its ends attached to the shafts at points a distance apart so as to form a V-shaped loop, the sides of which will wind toward and unwind from each other.

3. In elevated carriers, two horizontally disposed shafts mounted substantially parallel to each other in the framework of the carrier, means to rotate the shafts, a receptacle having a bail secured to its ends and a hoisting chain connected to each side of the bail and having their ends attached to the shafts.

4. In elevated carriers, two horizontally disposed shafts mounted substantially parallel to each other in the framework of the carrier, means to rotate the shafts, a receptacle having a bail secured to its ends, clips applied to the sides of the bail and hoisting chains passed through the clips under the bail, and having their ends attached to the shafts.

5. The combination of two horizontally disposed shafts mounted substantially parallel to each other in the framework of the carrier, gears affixed to one end of the shafts, a frame surrounding the gears mounted on the shafts, and worms mounted in the frame so as to rotate the gears.

6. The combination of two horizontally disposed shafts mounted substantially parallel to each other in the framework of the carrier, gears affixed to one end of the shafts, a frame surrounding the gears mounted on the shafts, a cross-wise shaft set in the frame and worms adapted to rotate the gears mounted on said shaft.

7. The combination of two horizontally disposed shafts mounted substantially parallel to each other in the framework of the carrier, gears affixed to one end of the shafts, a frame surrounding the gears mounted on the shafts, a cross-wise shaft set in the frame, worms adapted to rotate the gears mounted on the ends of the shaft and a chain wheel adapted to rotate the worms mounted on the shaft between the worms.

8. The combination of a carrier adapted to run on an overhead track, two horizontally disposed shafts mounted in the framework of the carrier, a receptacle having a bail, hoisting chains connecting the bail to the shafts, gears on one end of the shafts, worms adapted to rotate the gears and a chain wheel adapted to rotate the worms.

9. The combination of two yokes, each carrying a wheel adapted to run on an overhead track, casting secured to said yokes, two horizontally disposed shafts mounted in said castings substantially parallel to each other, means to rotate the shafts, a receptacle having a bail, and hoisting chains connecting said bail to the shafts.

10. The combination of two yokes, each carrying a wheel adapted to run on an overhead track, two-part castings connected to the lower ends of said yokes, a pair of horizontally disposed revoluble shafts mounted in said castings, substantially parallel to each other, recesses in the inner faces of said castings surrounding the shafts and pins passed through the shafts and projecting into said recesses, and rotatable therein.

11. In a device of the character described, a track, a carriage to run thereon, a bail adjustably connected to the carriage, a receptacle pivoted to and carried by the bail, latching means secured to the bail to hold the receptacle in loaded position, a stop on the track, tripping means on the bail adapted when brought into contact with the stop to release the latching means and dump the receptacle, and means to hoist the bail and bring the trip thereon into line with the stop on the track.

12. In elevated carriers, a receptacle pivoted to a bail, latching means to hold the receptacle in loaded position, tripping means secured to the bail to release the latch, a stop on the track to operate the trip when brought into contact with it, means to hoist the receptacle and bring the bail into contact with the carrier frame, a stop on the carrier frame to hold the bail in rigid position so the trip will be held in line with the stop on the track.

13. In elevated carriers, a receptacle pivoted to a bail, latching means to hold the receptacle in loaded position, tripping means secured to the bail to release the latch, a stop on the track to operate the trip when brought into contact with it, means to hoist the receptacle and bring the bail into contact with the carrier frame, a forked stop on the carrier frame to straddle and hold the bail in rigid position as and for the purpose set forth.

14. In elevated carriers, a winding shaft carrying a hoisting chain, a gear on the shaft, a frame having an upwardly projecting spur, a worm mounted in the frame in mesh with the gear, a chain wheel adapted to rotate the worm and a chain hung in the wheel and adapted to be placed over and held by the spur, so as to lock the wheel against backward rotation.

15. In elevated carriers, an overhead track, a stop secured at each end to the track by clips adapted to slide thereon, and provided with a body between the clips set at an incline to the track, and a key adapted to slide on the incline and fasten or loosen the stop on the track.

16. In elevated carriers, an overhead track, a stop secured at each end to the track by clips adapted to slide thereon, and provided with a body between the clips set at an incline to the track, and a key having a groove on its upper edge to fit the track and on its lower edge to fit the body of the stop and to slide thereon.

17. In elevated carriers, a receptacle having a catch on each of its ends, a bail pivoted to the ends of the receptacle below the catches, two slots in each end of the bail above the pivots, a latch piece at each end having two lugs adapted to pass through the slots in the bail the upper lugs to engage the catches adjacent, means to release them therefrom, and means to engage the lower lugs and move the latch piece so the upper lugs will again come into engagement with the catches.

18. In elevated carriers, a receptacle having on each of its ends a catch, and below it an outwardly projecting finger, a bail pivoted to the ends of the receptacle below the fingers, two slots in each end of the bail above the pivots, a latch piece at each end having two lugs adapted to pass through the slots in the bail, the upper lugs to engage the catches adjacent, means to raise the latch pieces from engagement with the catches, whereby the lower ends of the latch pieces will move into the lower slots and the pieces will be held in elevated position until the tilting of the receptacle brings the lower lugs into engagement with the fingers, whereby the lower ends of the pieces will be released from the lower slots and the pieces will drop to their original position when the upper lugs will be in position to again engage the catches.

19. In elevated carriers, a receptacle having catches on its ends, a bail pivoted to the ends of the receptacle below the catches, latch pieces mounted in the lower ends of the bails and adapted to engage the catches, an inverted T-shaped rocker bar pivoted to the upper central portion of the bail, means connecting the latching pieces to the ends of the rocker bar, and means to tilt the rocker-bar so as to release the latches.

20. In elevated carriers, a receptacle having catches on its ends, a bail pivoted to the ends of the receptacle below the catches, latch pieces mounted in the lower ends of the bails, and adapted to engage the catches, an inverted T-shaped rocker bar pivoted to the upper central portion of the bail, eye bolts pivotally connected to the ends of the rocker bars, chains connecting the latching pieces and the eye bolts together, and means to tilt the rocker-bar so as to release the latches.

21. In elevated carriers, a receptacle having catches on its ends, a bail pivoted to the ends of the receptacle below the catches, latch pieces mounted in the lower ends of the bails and adapted to engage the catches, an inverted T-shaped rocker bar pivoted to the upper central portion of the bail, studs pivotally secured to the ends of the rocker-bar, eye-bolts passed through the studs, chains connecting the latching pieces and the eye-bolts together, and means to tilt the rocker-bar so as to release the latches.

22. In elevated carriers, a receptacle having catches on its ends, a bail pivoted to the ends of the receptacle below the catches, latch pieces mounted in the lower ends of the bails and adapted to engage the catches, an inverted T-shaped rocker bar pivoted to the upper central portion of the bail, studs pivotally secured to the ends of the rocker-bar, eye-bolts passed through the studs, chains connecting the latching pieces and the eye-bolts together, an overhead track for the carrier to run upon and a stop on the track adapted to tilt the rocker bar so as to release the latches.

23. In elevated carriers, a receptacle having catches on its ends, a bail pivoted to the ends of the receptacle below the catches, latch pieces mounted in the lower ends of the bails and adapted to engage the catches, an inverted T-shaped rocker-bar having its upright portion made forked to straddle the upper central part of the bail and pivoted thereto, chains connecting the latching pieces and the ends of the rocker-bar together and means to tilt the rocker-bar so as to release the latches.

24. In elevated carriers, a receptacle having a bail pivoted to its ends, means to raise and lower the same with respect to the carrier, latching pieces mounted in the lower ends of the bail to hold the receptacle in loaded position, a rocker-bar pivoted to the upper central portion of the bail, means connecting the latching pieces and the lower ends of the rocker-bar together, means to rigidly fasten the bail in elevated position, a track for the carrier to run upon and a stop on the track to tilt the rocker-bar so as to release the latches.

25. In elevated carriers, two horizontally disposed shafts mounted substantially parallel to each other in the framework of the carrier, a receptacle having a bail pivoted to its ends, hoisting chains secured to the bail and having their ends attached to the shafts, latching pieces mounted in the lower ends of the bail to hold the receptacle in loaded position, a rocker-bar pivoted to the upper central portion of the bail, means connecting the latching pieces and the ends of the rocker-bar together, a track for the carrier to run upon and a stop on the track to tilt the rocker-bar so as to release the latches.

Fairfield, Iowa, Feb. 9, 1910.

ALBERT H. NELLER.

Witnesses:
JEFF. G. PENCE,
A. C. LOUDEN.

Copies of this patent may be obtained for five cents each, by addressing the "Commissioner of Patents, Washington, D. C."